US009727441B2

(12) United States Patent
Agarwal et al.

(10) Patent No.: US 9,727,441 B2
(45) Date of Patent: Aug. 8, 2017

(54) GENERATING DEPENDENCY GRAPHS FOR ANALYZING PROGRAM BEHAVIOR

(75) Inventors: Sharad Agarwal, Seattle, WA (US); Ratul Mahajan, Seattle, WA (US); Alice X. Zheng, Seattle, WA (US); Paramvir Bahl, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1423 days.

(21) Appl. No.: 13/208,370

(22) Filed: Aug. 12, 2011

(65) Prior Publication Data
US 2013/0042154 A1  Feb. 14, 2013

(51) Int. Cl.
*G06F 11/07* (2006.01)
*G06F 11/36* (2006.01)
*G06F 11/22* (2006.01)

(52) U.S. Cl.
CPC ........ *G06F 11/3612* (2013.01); *G06F 11/079* (2013.01); *G06F 11/0709* (2013.01); *G06F 11/2257* (2013.01); *G06F 11/3604* (2013.01)

(58) Field of Classification Search
CPC .. G06F 11/30; G06F 11/3048; G06F 11/0775; G06F 11/079; G06F 11/0709; G06F 11/0748; G06F 11/3604; G06F 11/2257
USPC ........................................ 714/25, 26, 27, 28
See application file for complete search history.

(56) References Cited

U.S. PATENT DOCUMENTS

| | | | | |
|---|---|---|---|---|
| 5,323,393 A | * | 6/1994 | Barrett et al. | 370/449 |
| 5,533,116 A | * | 7/1996 | Vesterinen | H04L 41/0206 379/243 |
| 6,012,152 A | * | 1/2000 | Douik | G06F 11/0709 714/26 |
| 7,096,459 B2 | * | 8/2006 | Keller | G06F 11/079 714/E11.027 |
| 7,409,676 B2 | * | 8/2008 | Agarwal et al. | 717/120 |
| 7,499,777 B2 | * | 3/2009 | Grichnik et al. | 701/31.9 |

(Continued)

OTHER PUBLICATIONS

Sun, et al., "Runtime Self-Diagnosis and Self-Recovery Infrastructure for Embedded Systems," retrieved at <<http://ieeexplore.ieee.org/stamp/stamp.jsp?arnumber=05298421>>, Third IEEE International Conference on Self-Adaptive and Self-Organizing Systems, Sep. 2009, pp. 284-285.

(Continued)

*Primary Examiner* — Joseph Schell
(74) *Attorney, Agent, or Firm* — Lyon & Harr, LLP; Mark A. Watson

(57) ABSTRACT

An analysis management system (AMS) is described that analyzes the in-field behavior of a program resource installed on a collection of computing devices, such as mobile telephone devices or the like. In operation, the AMS can instruct different devices to collect data regarding different observation points associated with the program resource, thus spreading the reporting load among the devices. Based on the data that is collected, the AMS can update a dependency graph that describes dependencies among the observation points associated with the program resource. The AMS can then generate new directives based on the updated dependency graph. The AMS can also use the dependency graph and the collected data to infer information regarding observation points that is not directly supplied by the collected data.

20 Claims, 11 Drawing Sheets

(56) References Cited

U.S. PATENT DOCUMENTS

| | | | |
|---|---|---|---|
| 7,577,872 | B2 | 8/2009 | DiBartolomeo et al. |
| 7,650,272 | B2* | 1/2010 | Przytula et al. ............... 703/20 |
| 7,665,082 | B2 | 2/2010 | Wyatt et al. |
| 7,673,180 | B1* | 3/2010 | Chen .................... G06F 11/362 714/38.11 |
| 7,869,824 | B2 | 1/2011 | Min |
| 8,024,611 | B1* | 9/2011 | Meek et al. .................... 714/26 |
| 8,037,195 | B2* | 10/2011 | Anuszczyk et al. .......... 709/229 |
| 2004/0049365 | A1* | 3/2004 | Keller .................. G06F 11/079 702/186 |
| 2007/0067373 | A1 | 3/2007 | Higgins et al. |
| 2008/0016115 | A1* | 1/2008 | Bahl ...................... H04L 41/22 |
| 2009/0055684 | A1* | 2/2009 | Jamjoom et al. ............... 714/26 |
| 2010/0197238 | A1 | 8/2010 | Pathuri et al. |
| 2011/0087924 | A1 | 4/2011 | Kandula et al. |
| 2011/0209001 | A1* | 8/2011 | Simma et al. .................. 714/26 |
| 2012/0101800 | A1* | 4/2012 | Miao .................. G06F 11/3608 703/22 |
| 2012/0197929 | A1* | 8/2012 | Williams ................ G06F 9/445 707/769 |
| 2012/0215912 | A1* | 8/2012 | Houlihan ............. G06F 9/5072 709/224 |

OTHER PUBLICATIONS

Tacey, et al., "Mobile Payphone System," retrieved at <<http://ieeexplore.ieee.org/stamp/stamp.jsp?tp=&arnumber=271912>>, IEEE Region 10 International Conference on Technology Enabling Tomorrow: Computers, Communications and Automation towards the 21st Century, Nov. 1992, pp. 413-417.

Sujith, "New self diagnostic application from Nokia Beta lab for Nokia mobiles," retrieved at <<http://www.techlineinfo.com/new-self-diagnostic-application-from-nokia-beta-lab-for-nokia-mobiles/>>, Feb. 6, 2010, 3 pages.

Bray, Tim, "Android Developers Blog: Android Application Error Reports," retrieved at <<http://android-developers.blogspot.com/2010/05/google-feedback-for-android.html>>, Google Inc., Mountain View, CA, May 21, 2010, 3 pages.

"Application Crash Report for Android," retrieved at <<http://code.google.com/p/acra/>>, retrieved on Apr. 28, 2011, Google Project Hosting, Google Inc., Mountain View, CA, 4 pages.

"Remotely log unhandled exceptions in your Android Applications," retrieved at <<http://code.google.com/p/android-remote-stacktrace/>>, retrieved on Apr. 28, 2011, Google Inc., Mountain View, CA, 3 pages.

"APP Hub: Develop for Windows Phone and XBOX 360," retrieved at <<http://create.msdn.com/en-US/>>, retrieved on Apr. 28, 2011, Microsoft Corporation, Redmond, WA, 2 pages.

Aguilera, et al., "Performance Debugging for Distributed Systems of Black Boxes," retrieved at <<http://citeseerx.ist.psu.edu/viewdoc/download?doi=10.1.1.118.6203&rep=rep1&type=pdf>>, Proceedings of the Nineteenth ACM Symposium on Operating Systems Principles, Oct. 2003, pp. 74-89.

Andrzejewski, et al., "Statistical Debugging using Latent Topic Models," retrieved at <<http://pages.cs.wisc.edu/~liblit/ecml-2007/ecml-2007.pdf>>, Proceedings of the 18th European Conference on Machine Learning, 2007, 12 pages.

Nainar, et al., "Adaptive Bug Isolation," retrieved at <<http://pages.cs.wisc.edu/~liblit/icse-2010/icse-2010.pdf>>, Proceedings of the 32nd ACM/IEEE International Conference on Software Engineering, vol. 1, May 2010, 10 pages.

Barham, et al., "Using Magpie for Request Extraction and Workload Modelling," retrieved at <<http://www.usenix.org/event/osdi04/tech/full_papers/barham/barham.pdf>>, Proceedings of the 6th Symposium on Operating Systems Design and Implementation, vol. 6, 2004, pp. 259-272.

Chen, et al., "Path-based Failure and Evolution Management," retrieved at <<http://research.microsoft.com/pubs/74738/paths-nsdi.pdf>>, Proceedings of the 1st Symposium on Networked Systems Design and Implementation, vol. 1, 2004, 14 pages.

Chen, et al., "Pinpoint: Problem Determination in Large, Dynamic Internet Services," retrieved at <<http://research.microsoft.com/pubs/74601/roc-pinpoint-ipds.pdf>>, Proceedings of the International Conference on Dependable Systems and Networks, Dec. 2002, 10 pages.

Chilimbi, et al., "Holmes: Effective Statistical Debugging via Efficient Path Profiling," retrieved at <<http://research.microsoft.com/pubs/73644/Holmes%20-%20Effecitve%20Statistical%20Debugging%20via%20Efficient%20Path%20Profiling.pdf>>, Proceedings of the 31st International Conference on Software Engineering, 2009, 11 pages.

Cohen, et al., "Correlating Instrumentation Data to System States: A Building Block for Automated Diagnosis and Control," retrieved at <<http://www.ifp.illinois.edu/~iracohen/publications/OSDI2004.pdf>>, Proceedings of the 6th Symposium on Operating Systems Design & Implementation, vol. 6, 2004, 14 pages.

Khan, et al., "DustMiner: Troubleshooting Interactive Complexity Bugs in Sensor Networks," retrieved at <<http://www.cs.uiuc.edu/~hanj/pdf/sensys08_mkhan.pdf>>, Proceedings of the 6th ACM Conference on Embedded Network Sensor Systems, Nov. 2008, 14 pages.

Kiciman, et al., "Live Monitoring: Using Adaptive Instrumentation and Analysis to Debug and Maintain Web Applications," retrieved at <<http://www.usenix.org/event/hotos07/tech/full_papers/kiciman/kiciman.pdf>>, Proceedings of the 11th USENIX Workshop on Hot Topics in Operating Systems, 2007, 6 pages.

Liblit, et al., "Bug Isolation via Remote Program Sampling," retrieved at <<http://citeseerx.ist.psu.edu/viewdoc/download?doi=10.1.1.14.6113&rep=rep1&type=pdf>>, Proceedings of the ACM SIGPLAN 2003 Conference on Programming Language Design and Implementation, Jun. 2003, 14 pages.

Liblit, et al., "Scalable Statistical Bug Isolation," retrieved at <<http://citeseerx.ist.psu.edu/viewdoc/download?doi=10.1.1.101.4185&rep=rep1&type=pdf>>, Proceedings of the 2005 ACM SIGPLAN Conference on Programming Language Design and Implementation, Jun. 2005, 12 pages.

Miller, et al., "The Paradyn Parallel Performance Measurement Tools," retrieved at <<http://citeseerx.ist.psu.edu/viewdoc/download?doi=10.1.1.41.2316&rep=rep1&type=pdf>>, IEEE Computer, vol. 28, Issue 11, Nov. 1995, 23 pages.

Murphy, Kevin P., "An Introduction to Graphical Models," retrieved at <<http://www.cs.ubc.ca/~murphyk/Papers/intro_gm.pdf>>, May 10, 2001, 19 pages.

Sambasivan, et al., "Categorizing and Differencing System Behaviours," retrieved at <<http://research.microsoft.com/en-us/um/people/alicez/papers/hotac07-spectroscope.pdf>>, HotAC II, Hot Topics in Autonomic Computing, 2007, 5 pages.

Yuan, et al., "Automated Known Problem Diagnosis with Event Traces," retrieved at <<http://www.cs.cmu.edu/~nlao/publication/older/p375-yuan.pdf>>, Proceedings of the 1st ACM SIGOPS/EuroSys European Conference on Computer Systems 2006, Apr. 2006, pp. 375-388.

"Statistical Inference," retrieved at <<http://en.wikipedia.org/wiki/Statistical_inference>>, Wikipedia online encyclopedia entry, retrieved on Jul. 3, 2011, 11 pages.

"Dependency Graph," retrieved at <<http://en.wikipedia.org/wiki/Dependency_graph>>, Wikipedia online encyclopedia entry, retrieved on Jul. 1, 2011, 3 pages.

Friedman, Nir, "The Bayesian Structural EM Algorithm," retrieved at <<http://www.cs.huji.ac.il/~nir/Papers/Fr2.pdf>>, Fourteenth Conference on Uncertainty in Artificial Intelligence, 1998, 10 pages.

Ravindranath, et al., "Change Is Hard: Adapting Dependency Graph Models for Unified Diagnosis in Wired/Wireless Networks," retrieved at <<http://delivery.acm.org>>,Proceedings of the 1st ACM Workshop on Research on Enterprise Networking, 2009, pp. 83-92.

Ghahramani, Zoubin, "Graphical models: parameter learning," retrieved at <<http://mlg.eng.cam.ac.uk/zoubin/papers/graphical-models02.pdf>>, In Handbook of Brain Theory and Neural Networks, MIT Press, 2003, 13 pages.

(56) References Cited

OTHER PUBLICATIONS

Kreps, Edward Jay, "Learning Structure in Directed Graphical Models," retrieved at <<http://classes.soe.ucsc.edu/cmps290c/Spring04/proj/jay.pdf>>, Jun. 2004, 8 pages.

Agarwal, et al., "There's an app for that, but it doesn't work. Diagnosing Mobile Applications in the Wild," retrieved at <<http://delivery.acm.org>>, Proceedings of the Ninth ACM SIGCOMM Workshop on Hot Topics in Networks, Oct. 2010, 6 pages.

* cited by examiner

GENERATING DEPENDENCY GRAPHS FOR ANALYZING PROGRAM BEHAVIOR

BACKGROUND

Various techniques exist for diagnosing the behavior of program resources running on computing devices, such as stationary personal computers. In one such known approach, a personal computer may generate a failure report whenever this device encounters anomalies in the execution of a program. The personal computer can then forward this failure report to an online service via a hardwired wideband connection. For example, the failure report can contain stack trace information or the like. Such a report may be relatively large in size. Upon receipt, the online service may compare the failure report against the signatures of known failure modes. If the online service is able to diagnose a failure, it can take corrective action, such as by downloading a program patch to the effected personal computer. Other personal computers behave in the same manner, e.g., by generating and transmitting failure reports which convey the same type of information to the online service.

The above approach, however, may not be fully feasible when applied to the case in which the computing devices represent mobile devices, such as mobile telephones and the like having limited resources.

SUMMARY

An illustrative analysis management system (AMS) is described herein for analyzing the operation of program resources (e.g., applications) running on computing devices ("devices") within any end-use environment. In one case, the devices correspond to mobile devices, such as mobile telephone devices having limited resources.

According to one illustrative aspect, the AMS can send different sets of directives to different devices. The different directives instruct the devices to collect information regarding different respective sets of observation points associated with the program resource. For example, a first device may be asked to report information regarding observation points A, B, and C, while a second device may be asked to report information regarding observation points D, E, and F, etc. In adopting this approach, the AMS can distribute the reporting load over a collection of devices, reducing the reporting load imposed on any one device.

According to another illustrative aspect, the AMS can generate the directives based on a dependency graph. The dependency graph describes dependencies among the observation points associated with the program resource. The AMS can then update the dependency graph upon the receipt of data that has been collected from the devices ("collected data"), in response to the directives. The AMS can then generate and transmit new directives based on the updated dependency graph. In this manner, the AMS can adopt an adaptive and dynamic strategy to explore the behavior of a program resource under consideration; this enables the AMS to progressively generate a more detailed account of dependencies associated with the program resource.

According to another illustrative aspect, the AMS can employ probabilistic techniques for inferring information regarding at least one observation point that is not directly conveyed by the collected data. The AMS performs this analysis based on the dependency graph. This aspect further reduces the amount of information that any individual device is asked to submit to the AMS.

According to another illustrative aspect, the AMS can diagnose the behavior of the program resource based on available evidence associated with the operation of the program resource, to provide at least one conclusion. The AMS can then notify the developer (and/or other entity) of the available evidence and/or the conclusion(s). The available evidence can include any of: the raw collected data; one or more inferences drawn from the collected data; and a current version of a dependency graph, etc. The diagnoses can also guide the AMS in generating new directives to be sent to the devices.

The above approach can be manifested in various types of systems, components, methods, computer readable media, data structures, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative analysis management system for analyzing the behavior of a program resource installed on a collection of computer devices. Section B describes illustrative methods which explain the operation of the analysis management system of Section A. Section C describes illustrative computing functionality that can be used to implement any aspect of the features described in Sections A and B.

Figure 12:
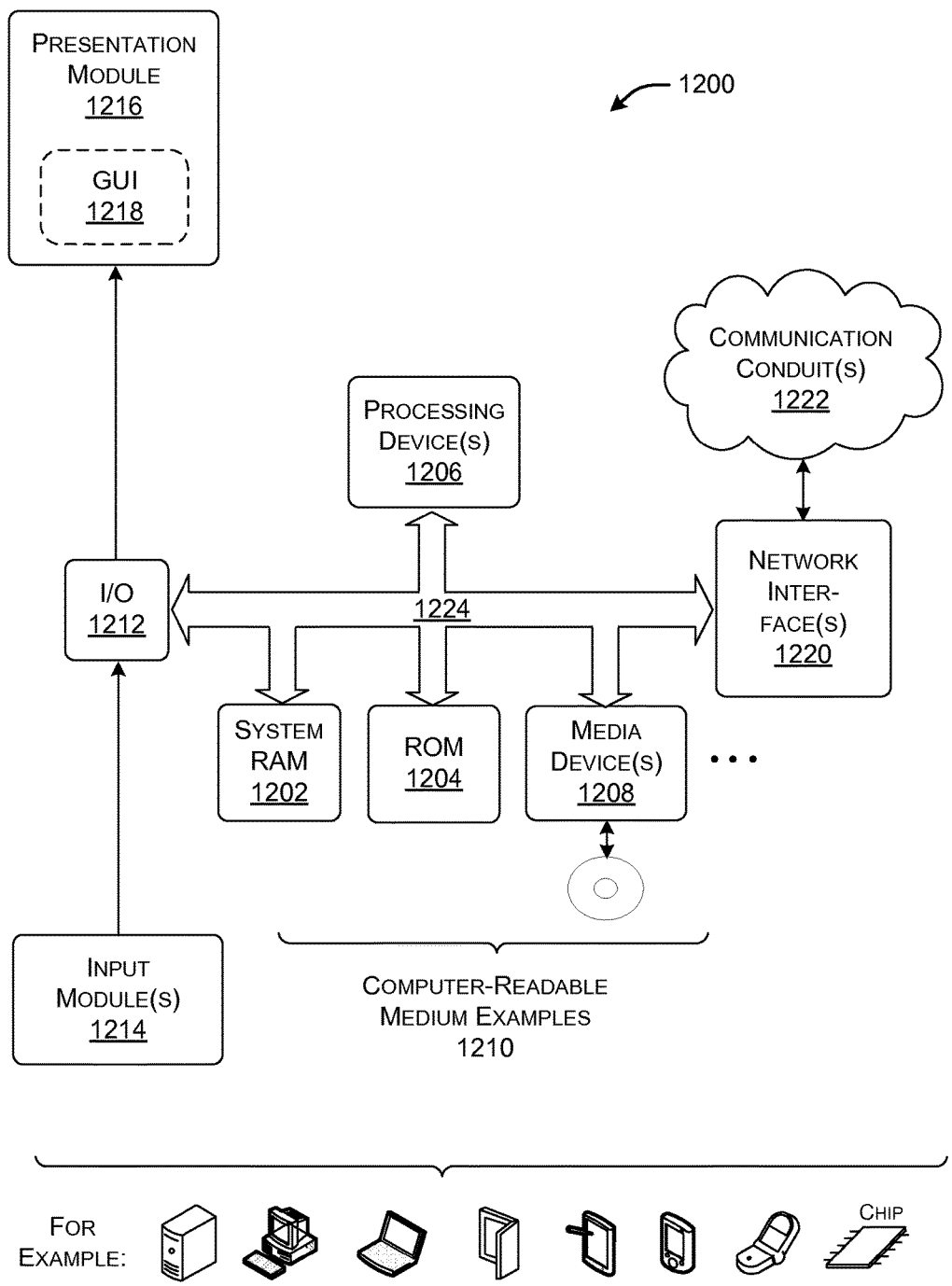
FIG. 12 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software, hardware (e.g., chip-implemented logic functionality), firmware, etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 12, to be discussed in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software, hardware (e.g., chip-implemented logic functionality), firmware, etc., and/or any combination thereof.

As to terminology, the phrase "configured to" encompasses any way that any kind of physical and tangible functionality can be constructed to perform an identified operation. The functionality can be configured to perform an operation using, for instance, software, hardware (e.g., chip-implemented logic functionality), firmware, etc., and/or any combination thereof.

The term "logic" encompasses any physical and tangible functionality for performing a task. For instance, each operation illustrated in the flowcharts corresponds to a logic component for performing that operation. An operation can be performed using, for instance, software, hardware (e.g., chip-implemented logic functionality), firmware, etc., and/or any combination thereof. When implemented by a computing system, a logic component represents an electrical component that is a physical part of the computing system, however implemented.

Figure 1:
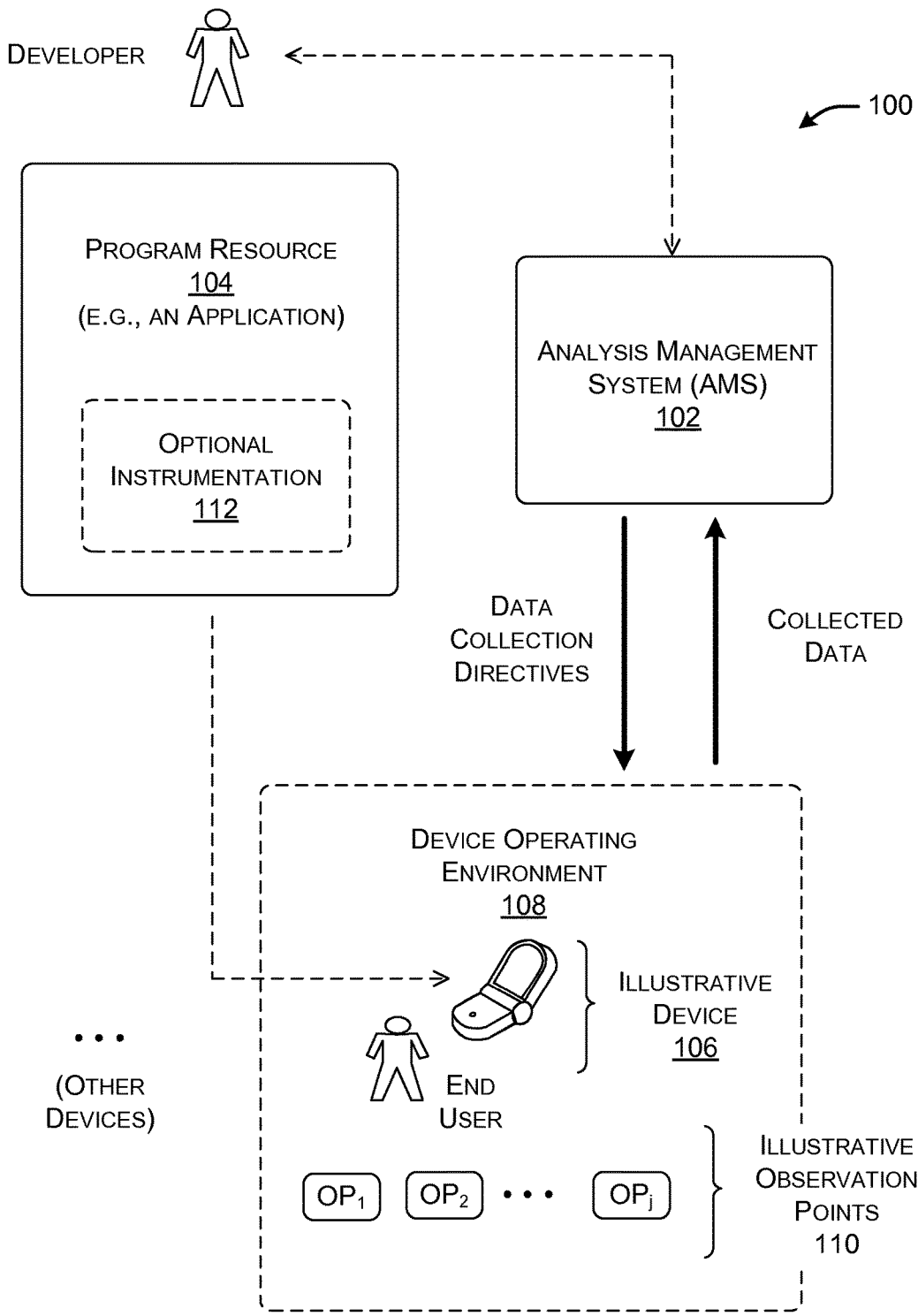
FIG. 1 shows an overview of an environment which uses an analysis management system (AMS) to analyze the behavior of a program resource, such as an application.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations A. Illustrative Systems and Devices A.1. Overview FIG. 1 shows an overview of an environment 100 in which an analysis management system (AMS) 102 analyzes the behavior of at least one program resource 104 that is installed on a collection of computing devices ("devices"), such as illustrative device 106. The device 106 executes the program resource 104 in the context of an operating environment 108. In other words, the environment 100 explores the "in-field" operation of the program resource 104, as end users interact with the program resource 104 in a "normal" manner to perform everyday tasks.

Figure 5:
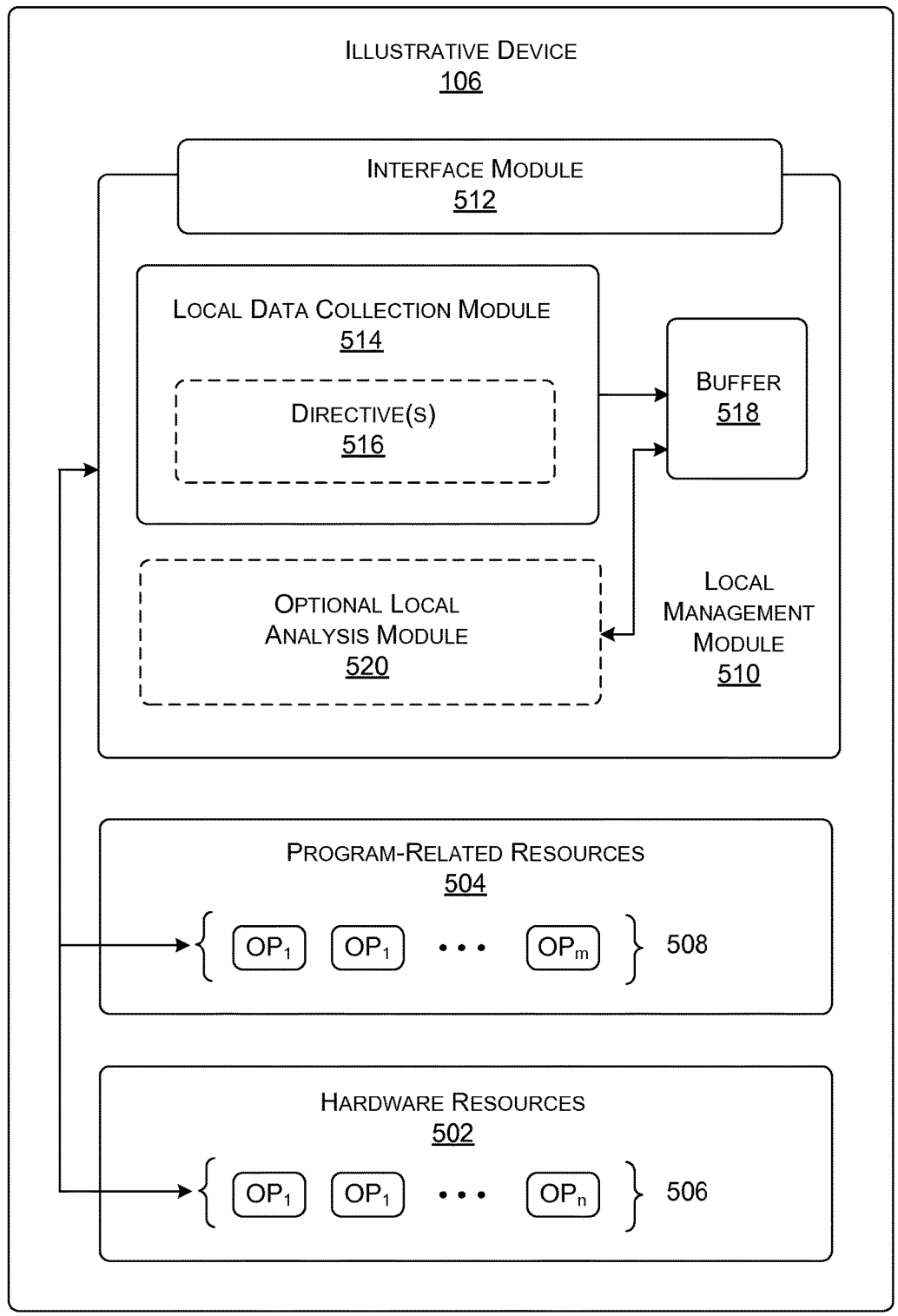
FIG. 5 shows a more detailed depiction of an illustrative device shown in FIG. 1.

In one illustrative case, the device 106 corresponds to any type of mobile computing device which communicates with other entities via a wireless network (at least in part). For example, the device 106 can correspond to a mobile telephone device, a personal digital assistant device, a laptop computer device of any size, an electronic book reader device, a handheld game console device, a vehicle-borne computer device, and so on. Such a computing device may have relatively limited processing and memory resources compared to a traditionally stationary device. Alternatively, the device 106 can correspond to a traditionally stationary device, such as a personal computer, a game console device, a set-top box device, and so on. FIG. 5, described in greater detail below, sets forth additional details of the illustrative device 106.

The program resource 104 can correspond to any functionality that performs any purpose. For example, in some cases, the program resource 104 can correspond to an application program ("application") that performs any higher-end function, as opposed to, for example, a program associated with the operating system of the device 106. Alternatively, the program resource 104 can perform a lower-end function. For example, the program resource 104 may correspond to a component of the operating system of the device 106. To facilitate description, this explanation will be framed in the context of the analysis of a single program resource 104; however, the AMS 102 can also be applied to the simultaneous investigation of any number of program resources and other device features.

In one case, the program resource 104 can be implemented as a series of program instructions, which, when implemented by a processing device provided by the device 106, carry out prescribed functions. Alternatively, or in addition, the program resource 104 can be implemented by hardwired logic circuitry, e.g., as implemented by Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The operating environment 108 encompasses any feature which pertains to the operation of the device in a particular setting. As one component, the operating environment 108 encompasses any aspect of the device 106 itself, including any aspect of its hardware resources and any aspect of its program-related resources. In addition, the operating environment 108 can describe any aspect of the setting in which the device 106 operates, where that aspect is otherwise not a property of the device 106 itself.

More specifically, the operating environment 108 can be characterized by a number of observation points 110, each of which describes some feature of the operating environment 108. For example, some observation points may describe the operation of the hardware provided by the device 106. For instance, hardware-related observation points can describe CPU load, available memory, hardware-related errors that have been encountered, and so on. Other hardware-related observation points can convey the static characteristics of the hardware of the device 106, such as its version.

Other observation points may describe the operation of program-related resources provided by the device 106. For instance, some program-related observation points can describe the performance of certain functions provided by the program resource 104, error codes generated by the program resource 104, and so on. Other program-related observation points can convey the static characteristics of the program-related resources of the device 106, such as the version of its operating system (OS).

Other observation points may describe characteristics of the setting in which the device 106 operates where those characteristics do not describe properties of the device 106 itself. For example, some setting-related observation points describe the time at which the device 106 operates, the location at which the device 106 operates, the technical framework (e.g., network type) which enables the device 106 to communicate with other devices, and so on. Other setting-related observation points can describe the functions of the program resource 104 that are being invoked by a user at any given time, and so on. For example, some setting-related observation points can identify commands that a user may have activated at any given time in the course of interacting with the program resource 104.

The above-described observation points are cited by way of example, not limitation; other operating environments can be characterized by other observation points.

The operating environment 108 can capture information associated with an observation point using any type of reporting functionality. In some cases, the device 106 can leverage native functionality to collect the information associated with certain observation points. In addition, or alternatively, a developer or other entity can add functionality to the operating environment 108 that enables it to report information regarding some observation points. For example, a developer can add performance-reporting code 112 to the program resource 104 which, when invoked, can supply information regarding one or more observation points. This yields an instrumented program according to the terminology used herein. For example, the developer can add code to the program resource 104 that reports an event each time a certain function call is invoked.

Generally, an observation point can report its findings in any manner. For example, in one case, an observation point can report its results as counter information, such as the number of network transactions that have taken place in a prescribed period of time. In some cases, an observation report provides raw unprocessed data. In other cases, an observation point can perform local processing of raw data, and then report the results of that local processing. Any event (or events) can prompt an observation report to provide its results. For example, an observation point can report its results when it encounters an error message, a program or component "crash," or a substandard-performing component or program function (without a complete failure), etc., or any combination of these events Having now set forth an illustrative framework in which the AMS 102 may operate, the operation of the AMS 102 itself will now be described, starting with an overview. The AMS 102 operates by sending directives to a collection of devices, including the device 106. The directives instruct each device to collect information associated with particular observation points. More specifically, in one implementation, the AMS 102 can use a distributed strategy to send different sets of directives to different respective groups of devices (where each group can include one or more devices). For instance, the AMS 102 can send a first set of directives to a first group of devices, instructing those devices to collect and send back information regarding observation points L, M, and N. The AMS 102 can send a second set of directives to a second group of devices, instructing those devices to collect and send back information regarding observation points P, Q, and R, and so on. In other cases, the groups of devices and/or the directives sent to the groups of devices can at least partially overlap (e.g., as in the case in which two groups include a common subset of devices, or in the case in which two groups are sent a common subset of directives).

In the above-specified manner, the AMS 102 can distribute the reporting load among the collection of devices; that is, no single device is asked to provide information regarding the full suite of observation points that are being invoked. This is advantageous in view of the potential resource limitations associated with the device 106, as well as the potential technical limitations of the wireless network which connects the device 106 to the AMS 102. Further, it may be considered undesirable from a financial perspective to ask any single device to transfer a large quantity of information over the wireless network.

Further, in some cases, the AMS 102 monitors the behavior of two or more program resources. In this case, the AMS 102 can generate some directives which solicit data that can be used by the AMS 102 to investigate common behavior of the plural program resources. The multi-purpose nature of these directives is another factor which reduces the reporting burden imposed on individual devices.

Any recipient device, such as device 106, can respond to a set of directives by collecting data regarding the observation points identified by the directives. This collection may occur over an extended period of time as the user interacts with the device 106. The device 106 can store the collected data in a buffer and then, at any appropriate time, forward the collected data to the AMS 102.

The AMS 102 can use the collected data to refine its understanding of dependencies among the observation points. The AMS 102 can leverage this understanding to modify the directives that its sends to the devices (as will be described in greater detail below). The new directives, for instance, may instruct the devices to collect information regarding new observation points. As a consequence, the AMS 102 may adaptively vary the nature and/or quantity of information that it solicits from the collection of devices over time.

Ultimately, the AMS 102 can use the collected data and discovered dependencies to classify the behavior of the program resource 104. For example, in the case in which the behavior presents a failure, the AMS 102 can use the collected data and discovered dependencies to attempt to diagnose the failure.

The AMS 102 can forward any information regarding its analysis to the developer entity which has produced the program resource 104, and/or to any other appropriate entity(ies). For example, the AMS 102 can provide any available evidence regarding the behavior of the program resource 104, such as the raw collected data, as well as inferences that have been established based on the collected data. In addition, or alternatively, the AMS 102 can forward information regarding dependencies that is has discovered within the operating environment 108, and/or information regarding failure-related conclusions that it has reached. In the opposite direction, the developer can optionally control at least in part the operation of the AMS 102. For example, the developer can instruct the AMS 102 to send certain directives to certain devices.

In one implementation, AMS 102 can be implemented by infrastructure associated with an operator which provides a wireless service to the collection of the devices. The AMS 102 itself can be implemented by one or more computer servers, data stores, routing functionality, and so on. The developer can interact with the AMS 102 via a developer system (not shown), which itself can be implemented by one or more computer servers, data stores, routing functionality, and so on. In this implementation, the AMS 102 represents central functionality that interacts with developer systems and devices. Alternatively, or in addition, at least some aspects of the AMS 102 can be implemented by one or more developer systems. Alternatively, or in addition, at least some aspects of the AMS 102 can be implemented in a local manner by the devices.

A.2. Dependency Graphs

Figure 2:
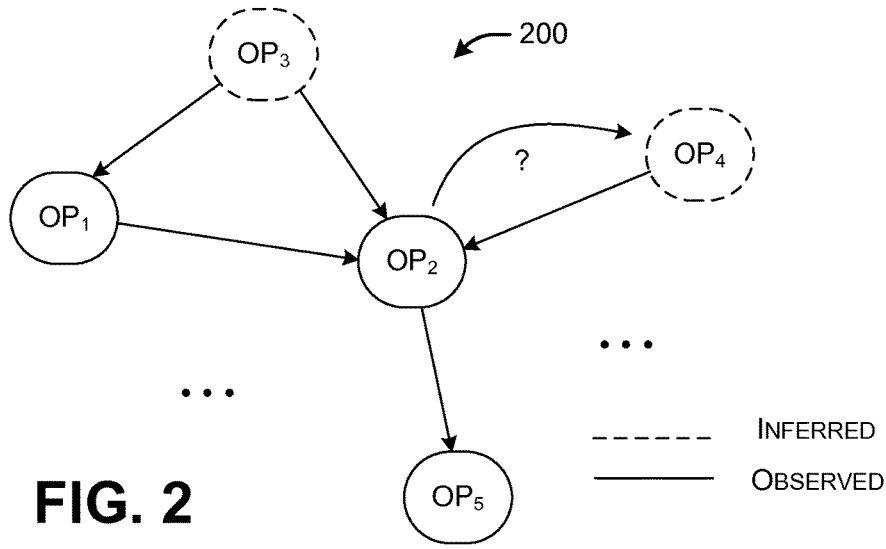
FIG. 2 is a high-level depiction of a portion of a dependency graph. The dependency graph describes dependencies among observation points associated with the program resource.

Advancing to FIG. 2, this figure shows a portion 200 of a dependency graph. The AMS 102 uses the dependency graph to represent, at any given time, its current understanding of the dependencies among observation points associated with the operating environment 108. More specifically, the dependency graph can be expressed as a set of nodes associated with different observation points. The dependency graph also includes a plurality of directed edges which connect the nodes together. A directed edge can be interpreted as an indication of potential causation or influence between two observation points. For example, the dependency graph of FIG. 2 shows an edge which connects a first observation point ($OP_1$) to a second observation point ($OP_2$), and another edge which connects the second observation point ($OP_2$) to a fifth observation point ($OP_5$). This means that the information associated with second observation point potentially depends on the information associated with the first observation point, and the information associated with the fifth observation point potentially depends on the information associated with the second observation point, and so on. Altogether, the dependency graph conveys a network of relations among observation points of any complexity and any nature.

The AMS 102 can represent a dependency graph in any manner, such as, in one example, a graph model which conveys conditional probabilities between observation points. For example, the dependency graph can identify the probability that node $OP_2$ has certain states, given the possible states node $OP_1$ and node $OP_3$ (where nodes $OP_1$ and $OP_3$ can be viewed as parents of the node $OP_2$). In certain implementation, the nodes can have discrete states. In that case, the dependency graph can express the probabilistic information for each node using a conditional probability table (CPT). Alternatively, or in addition, the nodes can have continuous states. In that case, the dependency graph can express the probabilistic information for a node as a conditional probability distribution (CPD), such as a Gaussian distribution.

Generally, the structure of a dependency graph represents the manner in which the nodes of the graph are connected together by the edges, reflecting the dependencies among respective pairs of observation points. The parameters of a dependency graph represent the information which conveys the probabilistic values associated with the nodes in the graph, e.g., as expressed using CPTs and/or CPDs.

In various circumstances (to be described below in greater detail), the AMS 102 can also leverage the dependency graph and the collected data to make inferences regarding the behavior of the program resource 104 at any given time. For example, assume that, at a particular point in time, the AMS 102 collects information regarding some observation points, but not information regarding other observation points. The AMS 102 can use statistical inference to generate information regarding the other observation points based on the information that is, in fact, provided by the collected data. This expansion of the collected data through inference is another technique which allows the environment 100 of FIG. 1 to reduce the amount of information that it collects from the devices.

Figure 3:
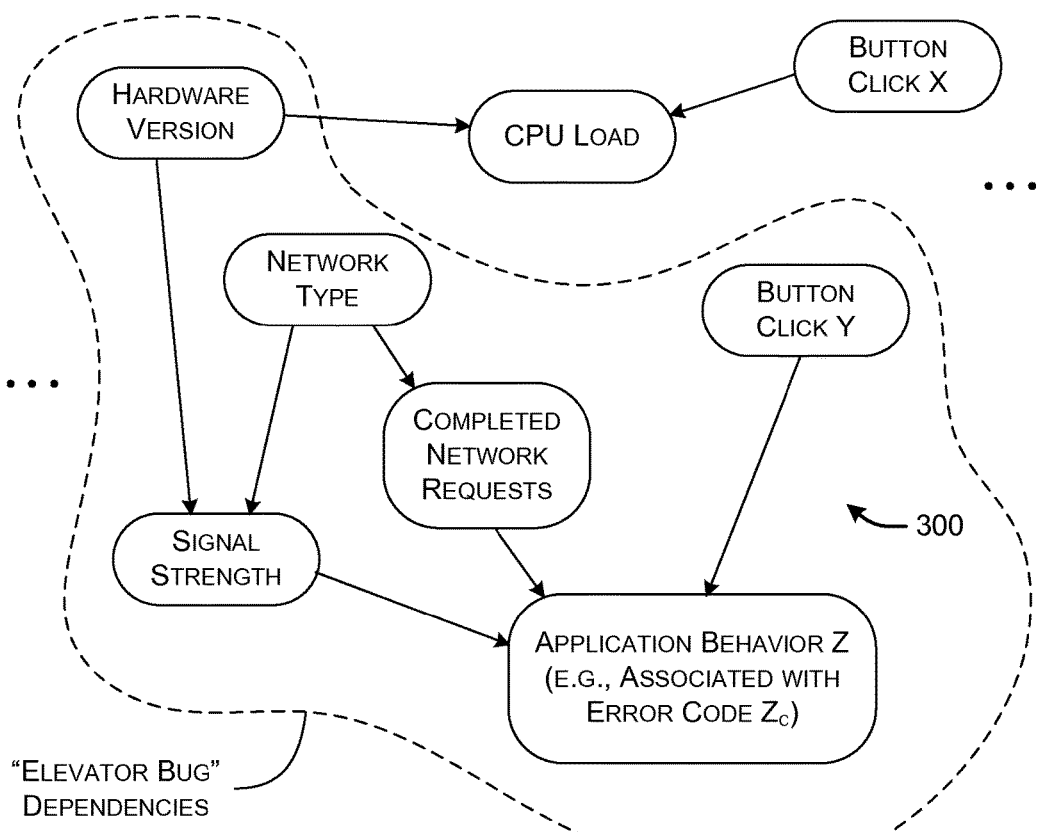
FIG. 3 shows an example of a portion of one particular dependency graph.

To be more concrete, FIG. 3 describes an example of a portion 300 of a particular dependency graph associated with particular observation points. This dependency graph includes some nodes that pertain to hardware resources (e.g., hardware version, CPU load, etc.), some nodes that pertain to program-related resources (e.g., error codes generated by a resource program, etc.), and some nodes that pertain to the setting in which the device 106 operates (such as network type, signal strength, various activations of interface buttons, etc.). At the present time, the dependency graph indicates that the signal strength of the device 106 is believed to depend on at least the version of hardware being used by the device 106, as well as the type of network to which the device 106 is connected. The graph further indicates that a number of completed network requests is believed to depend on at least the network type. The graph further conveys that there appears to be some nexus between an anomalous application behavior Z (associated with error code 4), the signal strength, the number of a completed network requests, and the activation of an interface button Y, and so on. Section B will provide an illustrative example which explains how such a dependency graph may be produced through adaptive exploration of program behavior.

A.3. The Analysis Management System

Figure 4:
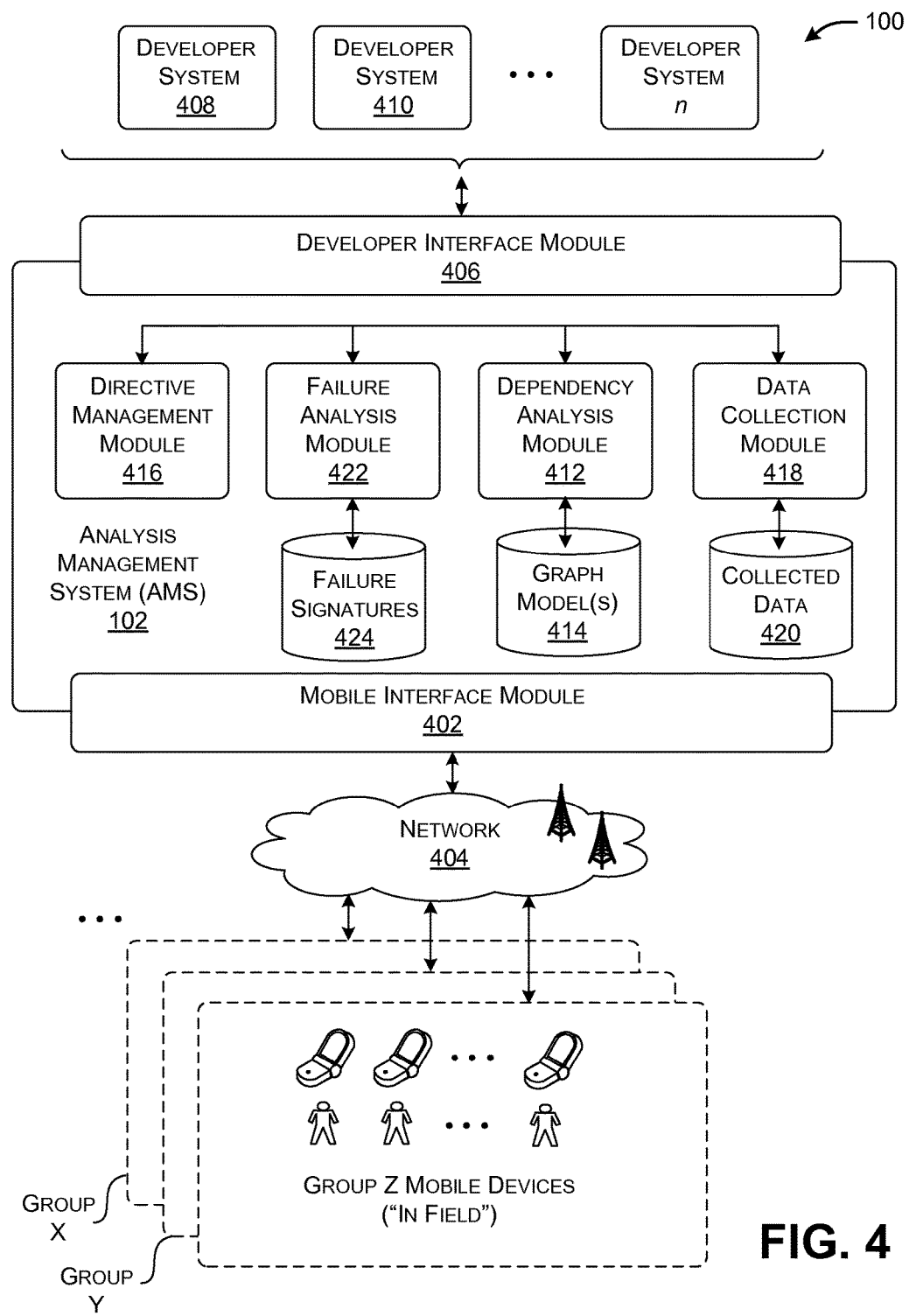
FIG. 4 shows a more detailed depiction of the environment of FIG. 1.

FIG. 4 provides a more detailed depiction of parts of the environment 100 shown in FIG. 1. In this example, the AMS 102 includes a mobile interface module 402 for interacting with one or more groups of devices (e.g., groups X, Y, Z, etc.) via a network 404. Each group can include one or more devices, such as the type of mobile device 106 shown in FIG. 1. The AMS 102 can provide a first set of directives to group X, a second set of directives to group Y, and a third set of directives to group Z, and so on. The network 404 can encompass any local area network and/or any wide area network (such as the Internet). The network 404 can be physically implemented using any collection of a hardwired links, wireless links and associated infrastructure, routing functionality, etc., as governed by any protocol or combination of protocols. The AMS 102 can also include a developer interface module 406 for interacting with one or more developer systems (e.g., 408, 410, . . . , n).

The AMS 102 further includes a dependency analysis module 412 for maintaining at least one dependency graph in a data store 414. As described above, a dependency graph conveys, at any given time, information regarding the dependencies that are believed to exist between observation points of the program resource 104.

The AMS 102 further includes a directive management module 416 for generating different directives for different groups of devices. The directive management module 416 can rely on one or more analysis factors in performing this task, as described in more detail in Section B. A directive itself can specify the observation points that a recipient device is requested to monitor. A directive can also specify the timing (e.g., the frequency) at which the recipient device is requested to submit collected data to the AMS 102 for each observation point. A directive can also specify other instructions.

A data collection module 418 receives collected data provided by the devices in response to the directives. The data collection module 418 can store the collected data in a data store 420. Upon receipt, the dependency analysis module 412 can update the dependency graph based on the collected data.

A failure analysis module 422 can diagnose the behavior of the program resource 104 based on any available evidence regarding its behavior. Such evidence can encompass the current state of the dependency graph, any raw collected information, any inferences that can be drawn based on the collected data, and so on. In one case, the failure analysis module 422 can perform its diagnosis by comparing the available evidence against failure signatures (stored in data store 424) which capture the characteristics of known modes of failure. If there is a match, the failure analysis module 422 can conclude that the program resource 104 has experienced a type of failure that is associated with the matching failure signature. At any time, the failure analysis module 422 can convey any information to a developer system and/or to any other entity. Such information may correspond to the available evidence and/or any conclusion(s) that the failure analysis module 422 is able to reach based on the available evidence.

The components in FIG. 4 can leverage the type of dependency graphs described in FIGS. 2 and 3 in the following manner. From a high level standpoint, the dependency graph can express various hypotheses regarding the connections between various observation points. Certain hypotheses may be more certain than others at any given time (as reflected by the probability information expressed by the graph). The directive management module 416 (in conjunction with the dependency analysis module 412) generates directives which seek to improve the accuracy and completeness of the hypotheses expressed in the graph. In certain cases, the directive management module 416 and the dependency analysis module 412 can perform this task by soliciting data from the devices which will confirm (or at least strengthen) the existing hypotheses expressed in the graph (if, in fact, they are valid hypotheses), or, alternatively, which will refute (or at least weaken) the existing hypotheses (if, in fact, they are invalid hypotheses). In other cases, the directive management module 416 and the dependency analysis module 412 can identify wholly new candidate dependencies among observation points, and then solicit data from the devices which confirms or refutes these new dependencies. The directive management module 416 and the dependency analysis module 412 can also generate directives which aim to confirm (or refute) assumptions regarding the independence of certain pairs of nodes.

Upon receiving collected data from the devices, the dependency analysis module 412 can then update the dependency graph in an appropriate manner. From a high level perspective, the dependency analysis module 412 updates the dependency graph so that it more accurately describes the dependencies among the observation points, based on the new evidence revealed in the collected data that has been provided by the devices in response to the directives. In one case, the dependency analysis module 412 can update the dependency graph by updating the parameters associated with the dependency graph. Alternatively, or in addition, the dependency analysis module 412 can update the dependency graph by updating the structure associated with the dependency graph, e.g., by modifying the edges, adding new nodes, etc.

In one case, the directive management module 416 can also consider the operation of the failure analysis module 422 in the course of generating directives. For example, assume that the failure analysis module 422 cannot match the behavior of the application with a known mode of failure. In response, the directive management module 416 can generate directives which solicit additional data from the devices, with the aim of clarifying the mode of failure. Otherwise, if the failure analysis module 422 is able to identify the mode of failure with suitable confidence, the failure analysis module 422 can eliminate or scale back on directives aimed at testing the program behavior in question, since it may be considered as having been adequately diagnosed.

A.4. Illustrative Device

FIG. 5 shows further details regarding the illustrative device 106 introduced in the context of FIG. 1. The device 106 can include various hardware resources 502, such as one or more processing devices, memory resources, network interface devices, and so on. The device 106 also includes various program-related resources, such as one or more applications, an operating system (OS), and so on. The program-related resources can specifically include the program resource 104 introduced in the context of FIG. 1. One or more observation points 506 may be associated with the hardware resources 502. Further, one or more observation points 508 may be associated with the program-related resource 504.

The device 106 also includes a local management module 510 for interacting with the AMS 102 via an interface module 512. The local management module 510 includes a local data collection module 514 for receiving one or more directives 516 from the AMS 102. The local data collection module 514 then proceeds to collect data associated with observation points identified by the directives 516. The local data collection module 514 can store the resultant collected data in a buffer 518, such as a circular buffer.

The local management module 510 can also optionally include a local analysis module 520 for performing local analysis on the collected data. For example, the local analysis module 520 can, on a periodic or other basis, receive failure signatures from the AMS 102. These failure signatures describe characteristics of established modes of failure. The local analysis module 520 can compare the collected data against the failure signatures to determine whether parts of the collected data match one or more failure signatures. If so, the local data collection module 514 can forego submitting this part of the collected data to the AMS 102, e.g., under the premise that it is not necessary to send data that has already been adequately diagnosed. Alternatively, in this circumstance, the AMS 102 can upload diagnosis information in lieu of the raw collected data itself.

The local data collection module 514 can also rely on the local analysis module 520 to determine the timing at which it is appropriate to send the collected data to the AMS 102. For example, the local analysis module 520 can ascertain that the collected data represents an urgent focus of analysis, e.g., because the collected data appears to impact critical resources of the device 106 and/or because the collected data represents an unknown mode of failure. If so, the local data collection module 514 can immediately forward the collected data to the AMS 102. In other cases, the local analysis module 520 can determine that the collected data represents a less urgent focus of analysis. If so, the local data collection module 514 can delay uploading of this collected data to the AMS 102, e.g., by sending the data at the end of day, end of the week, and so on. As described above, the directives themselves can also specify timing information which plays a role in determining the timing at which the local data collection module 514 sends collected data to the AMS 102. Still other factors may play a role in determining the timing at which the local data collection module 514 sends data to the AMS 102. For example, the local data collection module 514 can report the collected data on a more frequent basis using a Wi-Fi connection compared to a 3G cellular connection, because Wi-Fi incurs no cost or reduced cost compared to 3G.

B. Illustrative Processes

FIGS. 6-11 show procedures that explain one manner of operation of the environment 100 set forth in Section A. Since the principles underlying the operation of the environment 100 have already been described in Section A, certain operations will be addressed in summary fashion in this section.

Figure 6:
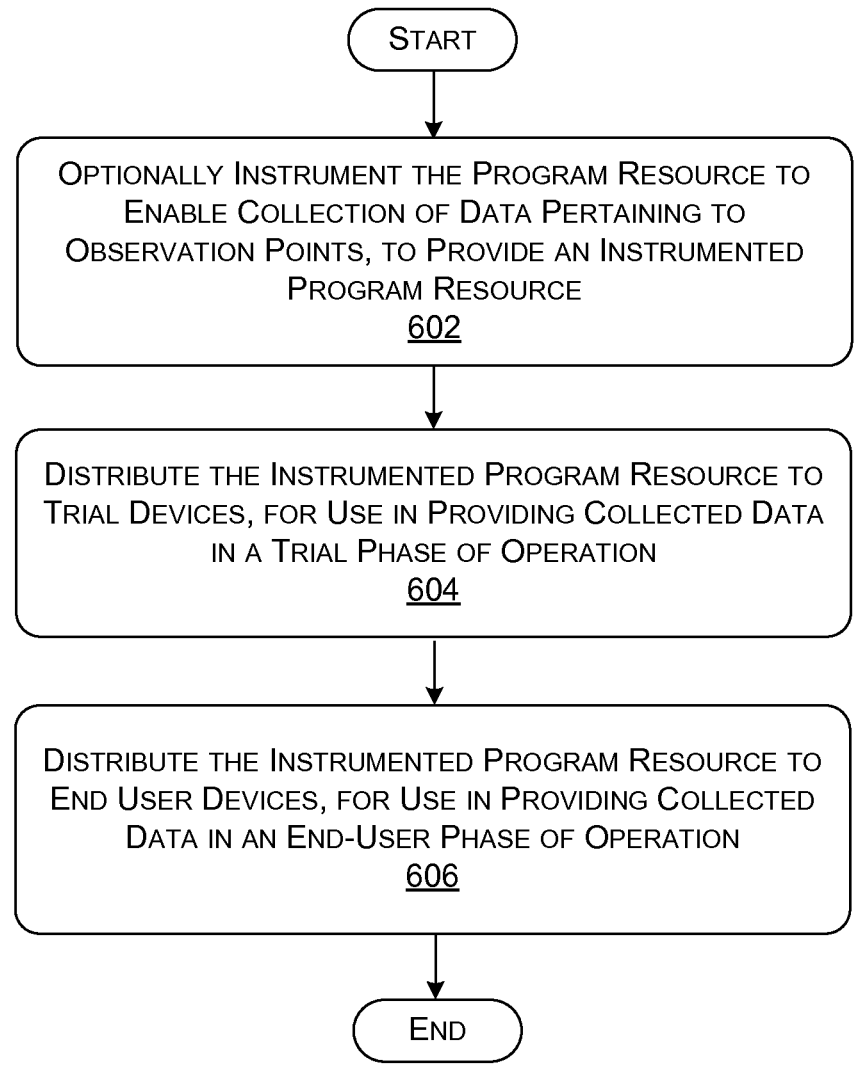
FIG. 6 shows an illustrative procedure for instrumenting a program resource and distributing the program resource to a collection of devices.

Starting with FIG. 6, this figure describes a procedure 600 by which the environment 100 can forward an instrumented program (such as the program resource 104) to the devices (such as device 106). In block 602, the developer (or other entity) can optionally instrument the program resource 104 with functionality that enables it to report information regarding one or more observation points. This creates an instrumented program. This block is optional because, alternatively, or in addition, the environment 100 can rely on native functionality provided by the device 106 to collect and forward information regarding the observation points.

In block 604, the program resource 104 is distributed to a group of trial devices, e.g., by allowing the trial users to download the program resource 104 from an appropriate online source. Trial users then interact with the trial devices within a trial phase of operation. For example, in one case, a developer may invite (or instruct) its employees to install the program resource 104 on their respective mobile devices. In this context, the employees constitute the trial users. The AMS 102 can then proceed to collect information regarding observation points associated with the program resource 104 as the trial users interact with the program resource 104. In other cases, the developer may invite ordinary end users (who are not necessarily employees) to install the program resource 104 on their devices in the trial phase of operation. In this context, the ordinary users constitute the trial users.

In any case, the trial phase of operation involves the collection of more information from the devices compared to a later end-user phase of operation. For example, the trial phase of operation may collect information regarding more observation points compared to the later end-user phase of operation. In addition, or alternatively, the trial phase of operation may collect more detailed information regarding each observation point compared to the later end-user phase of operation. As such, the trial phase of operation may make more demands on the hardware and program-related resources of the devices compared to the ender-user phase of operation; but this increased load is considered acceptable because the trial users have agreed to participate in the report-intensive trial phase of operation, with its potential performance-related shortcomings.

In block 606, the program resource 103 is distributed to a group of normal end users for their use in the end-user phase of operation. The end users can receive the program resource 104 by downloading the program resource 104 from an appropriate source.

Figure 7:
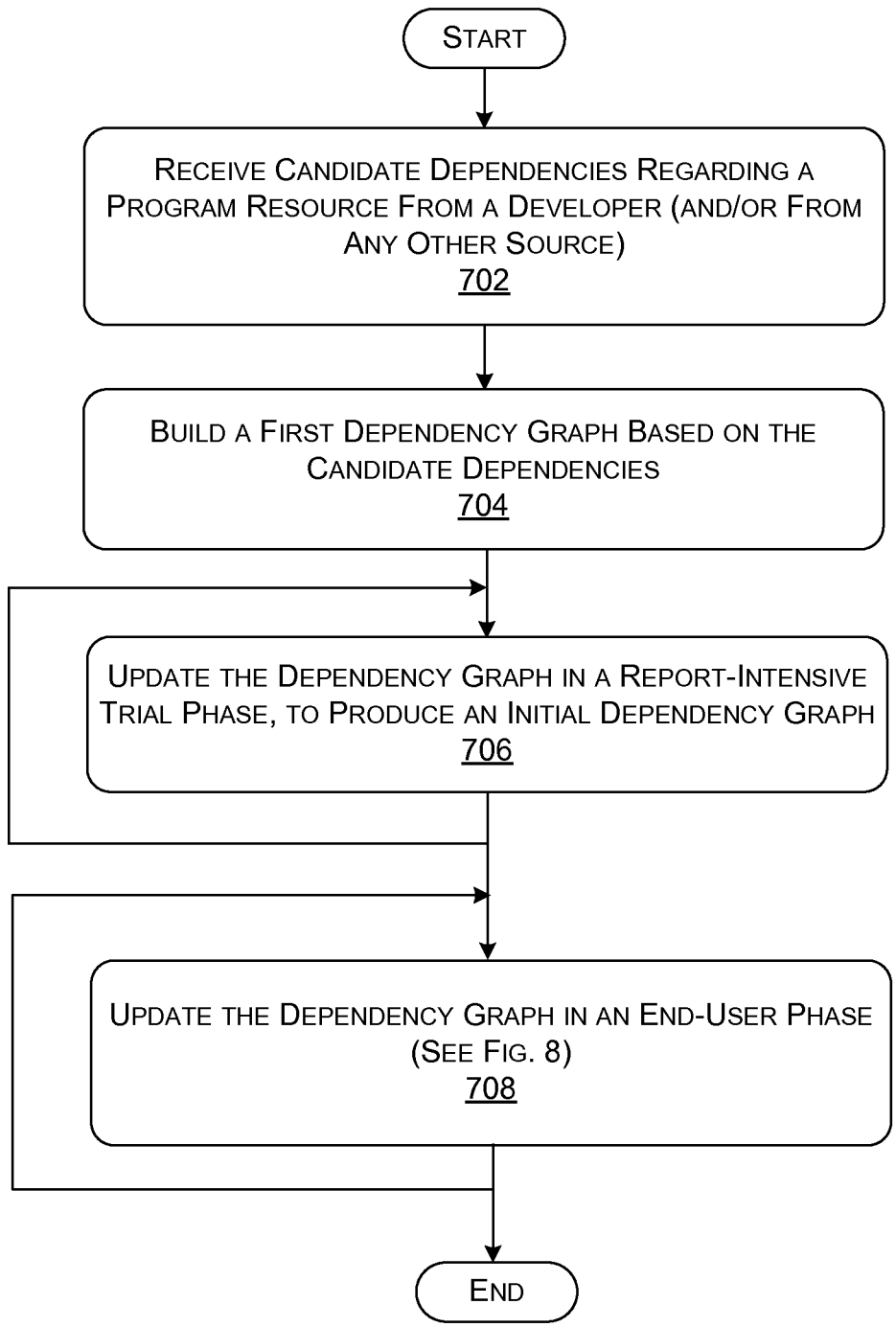
FIG. 7 shows an illustrative procedure for building a dependency graph in an adaptive manner.

FIG. 7 describes an adaptive procedure 700 for building a dependency graph, such as the type of dependency graph introduced in Section A in the context of FIGS. 2 and 3. By way of overview, the procedure 700 involves establishing a dependency graph and then successively refining it through a dynamic and adaptive strategy of data collection and analysis.

In block 702, the AMS 102 can receive initial dependency information from the developer of the program resource 104, and/or from any other appropriate entity(ies). The initial dependency information may indicate initial candidate dependencies associated with the program resource 104, as understood by the developer. More specifically, the person or team which has developed the program can be expected to have some understanding of the manner in which the components of the program resource 104 interact with each other, and the manner in which these components interact with certain external components. If so, the developer can forward initial dependency information to the AMS 102 which describes these dependences. In block 704, the dependency analysis module 412 of the AMS 102 can construct a first dependency graph expresses the initial dependency information.

In block 706, in the trial phase, the developer can make the program resource 104 available to a group of trial users. Next, the AMS 102 can iteratively refine the first dependency graph based on collected data received from the trial devices. The AMS 102 can receive the collected data in response to directives that it sends to the trial devices, where those directives may dynamically change over time. Block 706 results in the production of an initial dependency graph.

In block 708, in end-user phase of operation, the developer can then make the program resource 104 available to an unrestricted group of normal end users. Next, the AMS 102 can further refine the initial dependency graph based on collected data received from the end users' devices. The AMS 102 can receive the collected data in response to data collection directives that it sends to the end users' devices. The AMS 102 can repeat block 708 over the entire timespan for which the end users utilize the program resource 104, or over some initial period of use after the introduction of the program resource 104 (over the first month, year, etc.).

Consider the following high-level example of the operation of the procedure 700. Assume that, in the end-user phase, end users encounter an anomalous condition in an application when they attempt to download several files while stepping onto an elevator. This behavior may be referred to as an "elevator bug." At the outset, a developer or other entity may specify initial dependency information which indicates that the type of the network that is being used influences the efficiency at which information can be downloaded from an online source. But this fact alone does not explain the particular behavior set forth above.

During the trial phase of operation, the environment 100 can further refine the dependency graph to provide an enhanced understanding of the application's behavior. But assume that the trial phase, although it involves the collection of a large amount of information pertaining to a large number of observation points, fails to uncover the nexus of dependencies that are associated with the above-described elevator bug. This may be because the trial users may not have had an opportunity to use their devices while stepping onto an elevator in the above-described manner.

Finally, in the end-user phase of operation, the environment 100 can iteratively reveal the dependencies associated with the elevator bug. Those dependencies are represented by the dependency graph shown in FIG. 3. As indicated there, the dependency graph indicates that a certain error code $Z_c$ is associated with: (a) rapidly decreasing signal strength (e.g., which may occur when a user steps onto an elevator); (b) the number of completed network requests;

and (c) the activation of a certain download command (e.g., associated with the activation of an interface button Y). The failure analysis module 422 can diagnose the failure mode based on this enhanced dependency graph and/or send the dependency graph to the developer for manual evaluation.

Figure 8:
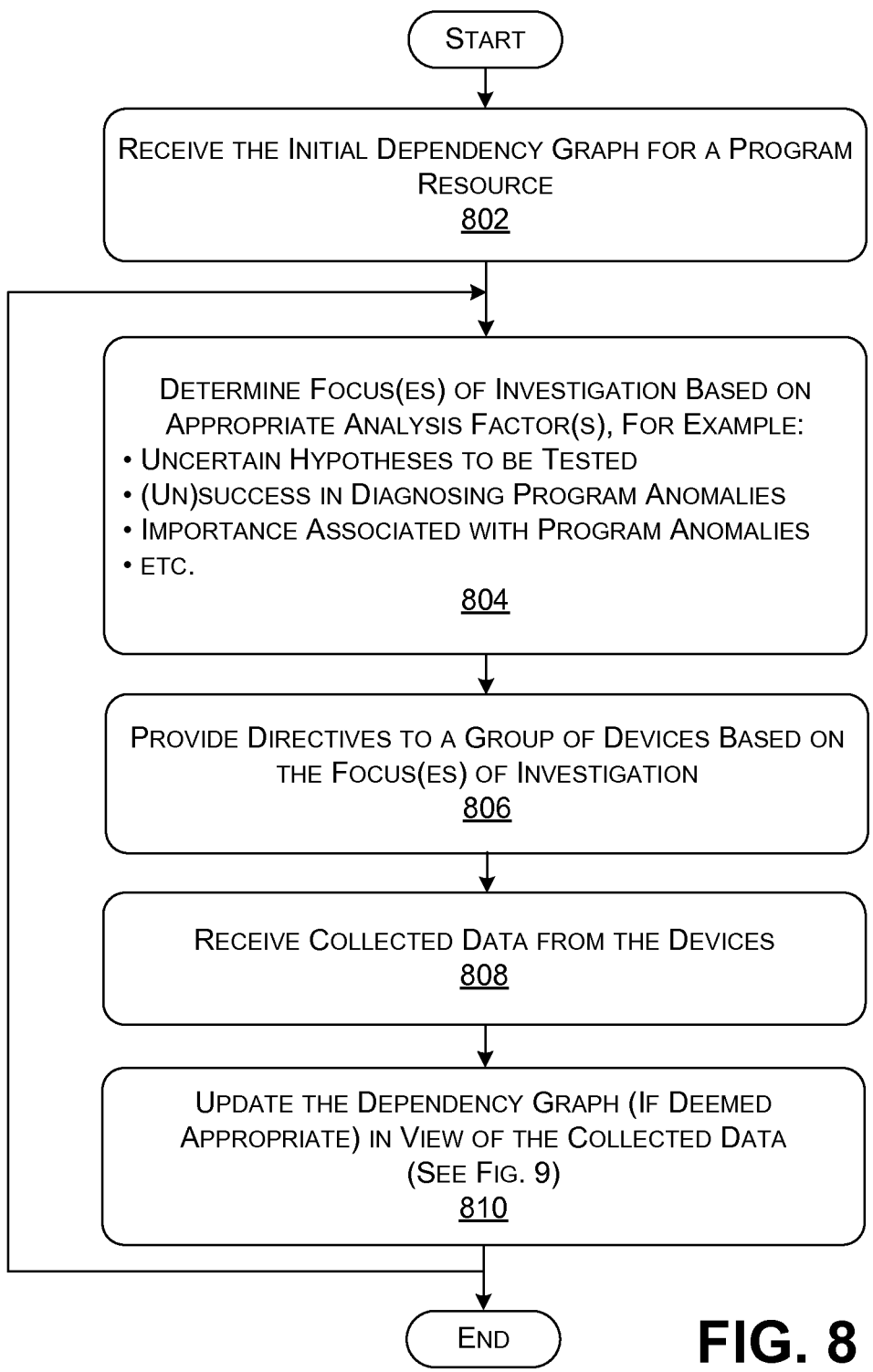
FIG. 8 shows further details regarding the procedure of FIG. 7.

FIG. 8 provides additional details regarding the operation of block 708 of FIG. 7, which, as said, involves the iterative refinement of a dependency graph in an end-user phase of operation. In block 802, the AMS 102 receives the initial dependency graph. The initial dependency graph may represent the outcome of block 706 of FIG. 7, in which a first dependency graph is iteratively refined in a trial phase of operation.

In block 804, the dependency analysis module 412 of the AMS 102 determines at least one focus of investigation based one or more analysis factors. Representative analysis factors are summarized below.

The Existence of Uncertain Hypotheses.

The dependency analysis module 412 can examine the current dependency graph to identify hypotheses regarding dependencies which have not yet been proven with a desired level of confidence (where the level of certainty associated with a hypothesis can be determined based on the parameters associated with that hypothesis). In response to this finding, the AMS 102 can decide to collect further information regarding these uncertain hypotheses, with the objective of further clarifying these hypotheses (e.g., by strengthening them if they are valid hypotheses or weakening them if they are invalid hypotheses). The dependency analysis module 412 can also prepare directives which aim at verifying the assumed independence between certain observation points.

The Existence of Uncertain Modes of Failure.

In another case, the dependency analysis module 412 can determine whether the failure analysis module 422 is able to successfully interpret the collected data that has been received, e.g., by successfully diagnosing any failures associated with the collected data. If this is not possible, then the AMS 102 can decide to collect further information regarding the unknown or uncertain modes of failure represented by the collected data. If, on the other hand, the failure analysis module 422 is able to ascertain the causes of failure with sufficient certainty, the AMS 102 may abandon its current strategy of data collection (because it is not yielding results which are in doubt); in its place, the AMS 102 can decide to explore some other focus of data collection, which may yield information regarding heretofore unknown dependencies and failure modes. In some cases, the "existence of uncertain modes of failure" analysis factor may overlap with the "existence of uncertain hypotheses" analysis factor. This is because the failure analysis module 422 may have difficulty in diagnosing a failure in those cases in which the dependency graph includes unresolved dependencies that are related to the mode of failure in question.

The Urgency of Diagnosis.

In another case, the AMS 102 may decide to adopt a robust data collection strategy because the collected data reveals a potential anomaly that has significant impact on the performance of the program resource 104. That strategy can involve the collection of a large quantity of information upon each reporting instance, and/or the collection of information at frequent intervals. The AMS 102 can adopt a less aggressive strategy for less critical failure modes.

Generally, the above-described analysis factors are cited by way of example, not limitation. Other implementations can apply additional analysis factors that influence its data reporting strategy, and/or can omit one or more of the analysis factors described above. The AMS 102 can alternatively, or in addition, determine the focus of analysis using any active learning technique. An active learning technique identifies the node (or nodes) in a dependency graph that can be investigated to produce the maximum reduction in the amount of uncertainty regarding the remainder of the (unobserved) nodes in the dependency graph.

In block 806, the directive management module 416 generates data collection directives which instruct the devices to collect data associated with the focus(es) of investigation identified in block 804. For example, suppose that the dependency graph currently indicates that there is a potential relationship between a user's activation of a certain function of the program resource 104 and the load placed on the CPU of the device 106, but that this relationship has not been established with a high level of confidence. In response, the directive management module 416 can instruct at least some devices to collect information regarding the load placed on the CPU and information regarding the activation of the particular function in question.

As described above, the directive management module 416 may ask different groups of devices to investigate different observation points. In this manner, the AMS 102 can spread the reporting load imposed on the devices over the entire population of devices. This avoids burdening any one device by asking it to collect and forward information regarding all of the observation points under consideration.

The directive management module 416 can use any strategy to allocate different directives to devices. In one case, the directive management module 416 can evenly partition the reporting load among the available devices, e.g., by randomly assigning a fixed number of reporting tasks to each device. In another case, the directive management module 416 can take into consideration other factors when allocating reporting tasks; for example, the device of a user who subscribes to a performance-enhanced data plan may be burdened less than a device of a user who subscribes to a less preferential plan, etc.

In block 808, the data collection module 418 of the directive management module 416 can receive collected data from the devices. That is, this data is collected and forwarded to the AMS 102 in response to the directives that the AMS 102 downloads in block 806. The data collection module 418 can store the collected data in a data store 420.

In block 810, the dependency analysis module 412 can update the dependency graph, if deemed appropriate, based on the data that has been collected in block 808. As described in Section A, this updating operation may entail either updating the parameters associated with the dependency graph or updating the structure of the dependency graph, or both.

Figure 9:
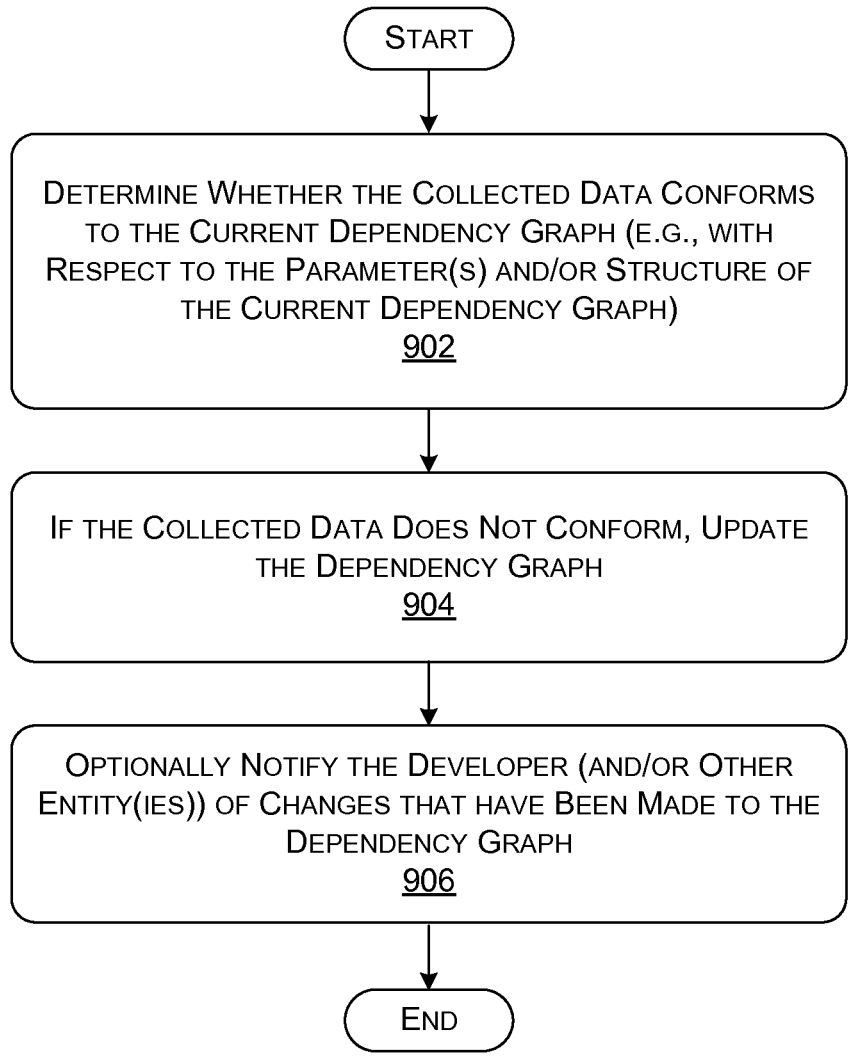
FIG. 9 shows further details regarding the procedure of FIG. 8.

More specifically, FIG. 9 shows a procedure which presents further information regarding block 810 of FIG. 8. In block 902, the dependency analysis module 412 determines whether the collected data (received in block 808) conforms to the dependencies expressed in the current dependency graph (e.g., with respect to the parameters and/or structure of the current dependency graph). In block 904, if the collected data does not conform, the dependency analysis module 412 updates the dependency graph in an appropriate manner to make it more conformant.

In general, known techniques exist for updating a graph model so that it conforms with newly collected data, as summarized, for example in Kevin P. Murphy, "An Introduction to Graphical Models," 2001. A first class of such techniques can be employed in those circumstances in which the structure of the dependency graph is known and in which information is available for all observation points. For example, one such technique involves forming maximum likelihood estimates for the parameters associated with each node in the dependency graph. A second class of techniques can be employed in those circumstances in which the structure of the dependency graph is considered known, but in which information is not available for all observation points. One such technique involves the use of the Expectation Maximization (EM) algorithm to determine the unknown parameters in question.

A third class of techniques can be employed in those circumstances in which the structure is considered unresolved, but in which information is available regarding all observation points. One such technique involves using a search algorithm to determine viable dependency graphs selected from a space of possible dependency graphs. A fourth class of techniques can be employed in those circumstances in which both the structure and some of the parameters are considered unknown. One such technique involves using a structured EM technique.

In block 906, the AMS 102 can optionally notify the developer (or any other appropriate entity(ies)) that it has updated the dependency graph for the program resource 104.

Although FIGS. 8 and 9 correspond to updating of the dependency graph in the end-user phase of operation, the same operations can be performed to update the dependency graph in the trial phase of operation.

Figure 10:
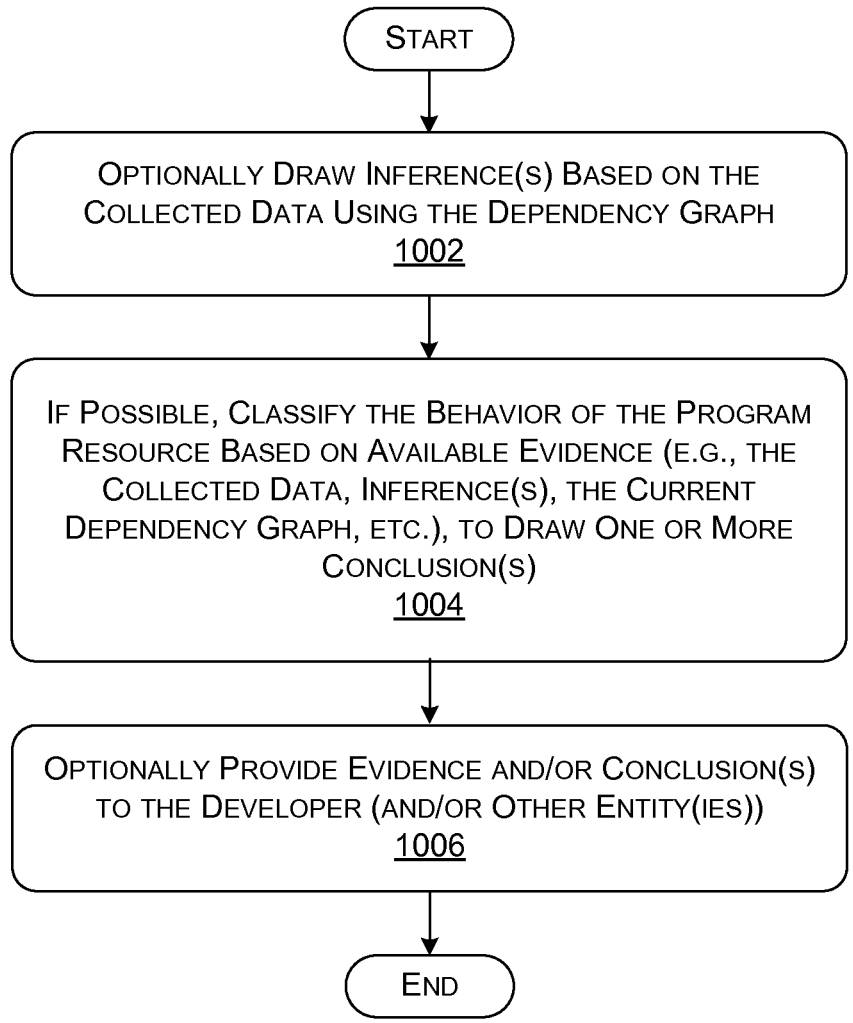
FIG. 10 shows an illustrative procedure for providing program analysis based on a dependency graph, e.g., to detect failures in the operation of the program resource.

FIG. 10 shows a procedure 1000 by which the failure analysis module 422 can analyze the behavior of the program resource 104, e.g., to identify failures in the program resource 104. In block 1002, the failure analysis module 422 can optionally draw inferences based on the existing version of the dependency graph in conjunction with the collected data. This allows the failure analysis module 422 to determine information regarding certain observation points, even though the collected data may not directly provide information regarding these observation points.

The failure analysis module 422 can use various techniques to perform this inference, such as Bayesian inference techniques. The failure analysis module 422 can also employ any known approximation technique to generate the inferences (due to the intractable nature of this problem in certain cases), such as loopy belief propagation techniques, sampling techniques (e.g., Monte Carlo techniques), variational techniques, etc.

In block 1004, the failure analysis module 422 can classify the behavior of the program resource 104 (if possible) based on available evidence regarding its behavior. Such available evidence can correspond to the raw collected data, inferences that have been drawn (in block 1002) based on the raw collected data, and/or the dependencies revealed by the current version of the dependency graph. More specifically, block 1004 may entail comparing known characteristics regarding the program resource 104 with a database of known failure signatures. If the failure analysis module 422 can make such a match with sufficient confidence, then the matching failure signature corresponds to a likely mode of failure that has occurred in the program resource 104.

In block 1006, the failure analysis module 422 optionally sends any available evidence to the developer (and/or to any other entity), as well as any conclusions that it has been able to reach based on the available evidence. The developer can use this information to gain a better understanding of the behavior of the program resource 104. The developer may decide to the revise the program resource 104 based on these insights.

Figure 11:
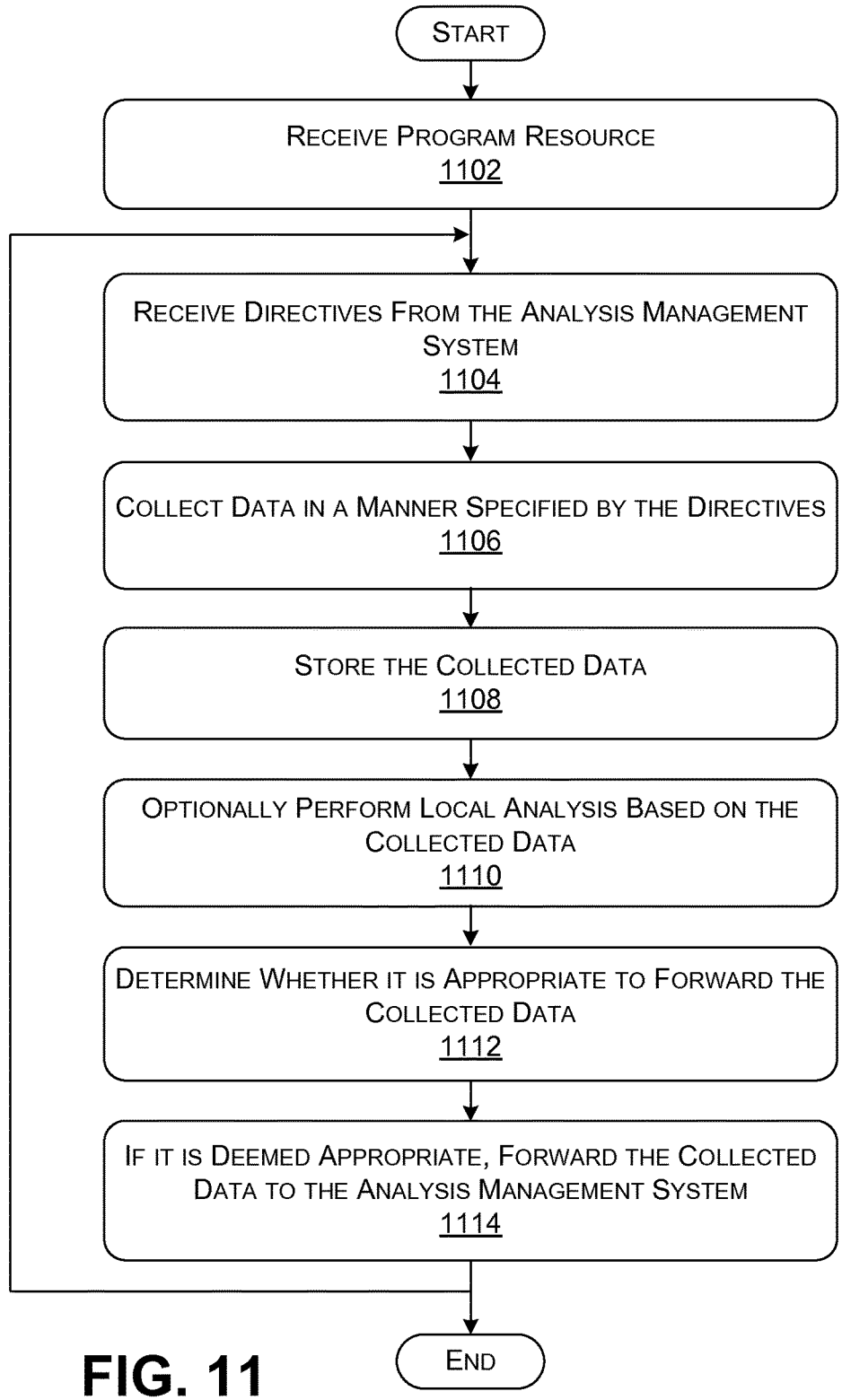
FIG. 11 shows an illustrative procedure that explains one manner of operation of the device of FIG. 5.

FIG. 11 shows a procedure 1100 which represents one manner of operation of the representative device 106. In block 1102, the device 106 receives and installs the program resource 104, e.g., either in the trial phase of operation or the end-user utilization phase of operation.

In block 1104, the device 106 receives directives from the AMS 102 that instruct it to collect information regarding identified observation points. As noted above, the AMS 102 may instruct different groups of devices to collect information regarding different sets of observation points.

In block 1106, the device 106 collects the information that is identified by the directives (received in block 1104). In block 1108, the device 106 can store the collected data in its buffer 518.

In block 1110, the device 106 can optionally perform local analysis on the collected data. For example, the device 106 can determine whether the collected data matches any failure signatures associated with known modes of failure. Alternatively, or in addition, the device 106 can determine the criticality of any failures that may be revealed in the collected data, e.g., by determining whether the collected data pertains to critical device resources or otherwise relates to critical events in the behavior of the device 106.

In block 1112, the device 106 determines whether it is appropriate to forward the collected data to the AMS 102, e.g., based on the analysis performed in block 1110. For example, the device 106 can decide to forego or delay uploading of the collected data if the collected data pertains to a known mode of failure and/or if the collected data appears to implicate non-critical device resources, etc. Alternatively, or in addition, the device 106 can upload the collected data at strategically selected times to reduce the traffic in the network 404, e.g., by submitting the data at off-peak hours and/or by staggering the submission of the data with respect to other devices, etc. In block 1114, the device 114 actually uploads the collected data to the AMS 102.

C. Representative Computing Functionality

FIG. 12 sets forth illustrative computing functionality 1200 that can be used to implement any aspect of the functions described above. For example, the computing functionality 1200 can be used to implement any aspect of the AMS 102 of FIG. 1, e.g., as implemented in the embodiment of FIG. 4, or in some other embodiment. In addition, the computing functionality 1200 can be used to implement any aspect of any device, such as the illustrative device 106 of FIG. 5. In one case, the computing functionality 1200 may correspond to any type of computing device that includes one or more processing devices. In all cases, the electrical data computing functionality 1200 represents one or more physical and tangible processing mechanisms.

The computing functionality 1200 can include volatile and non-volatile memory, such as RAM 1202 and ROM 1204, as well as one or more processing devices 1206 (e.g., one or more CPUs, and/or one or more GPUs, etc.). The computing functionality 1200 also optionally includes various media devices 1208, such as a hard disk module, an optical disk module, and so forth. The computing functionality 1200 can perform various operations identified above when the processing device(s) 1206 executes instructions that are maintained by memory (e.g., RAM 1202, ROM 1204, or elsewhere).

More generally, instructions and other information can be stored on any computer readable medium 1210, including, but not limited to, static memory storage devices, magnetic storage devices, optical storage devices, and so on. The term computer readable medium also encompasses plural storage devices. In all cases, the computer readable medium 1210 represents some form of physical and tangible entity.

The computing functionality 1200 also includes an input/output module 1212 for receiving various inputs (via input modules 1214), and for providing various outputs (via output modules). One particular output mechanism may include a presentation module 1216 and an associated graphical user interface (GUI) 1218. The computing functionality 1200 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area network, a wide area network (e.g., the Internet), etc., or any combination thereof. The communication conduit(s) 1222 can include any combination of hardwired links, wireless links, routers, gateway functionality, name servers, etc., governed by any protocol or combination of protocols.

Alternatively, or in addition, any of the functions described in Sections A and B can be performed, at least in part, by one or more hardware logic components. For example, without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In closing, AMS 102 can employ various mechanisms to ensure the privacy of any data that it collects and maintains. For example, the AMS 102 can refrain from collecting personal data that pertains to a user. In addition, or alternatively, the AMS 102 can allow individual users to expressly opt in to (and then expressly opt out of) the data collection provisions of the AMS 102. The AMS 102 can also provide suitable security mechanisms to ensure the privacy of collected data (such as data-sanitizing mechanisms, etc.).

Further, the description may have described various concepts in the context of illustrative challenges or problems. This manner of explanation does not constitute an admission that others have appreciated and/or articulated the challenges or problems in the manner specified herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented by physical and tangible computing functionality, for generating a dependency graph, comprising:
    receiving a dependency graph that describes dependencies among observation points associated with a program resource;
    determining at least one focus of investigation pertaining to the dependency graph based on at least one analysis factor;
    generating at least one directive based on said at least one focus of investigation;
    transmitting said at least one directive to at least one device;
    receiving collected data from said at least one device in response to said at least one directive;
    updating the dependency graph, if deemed appropriate, based on the collected data; and
    repeating said determining, generating, transmitting, receiving collected data, and updating at least one time.

2. The method of claim 1, wherein said at least one device comprises at least one mobile device.

3. The method of claim 1, wherein at least one observation point pertains to a behavior or characteristic of the program resource.

4. The method of claim 1, wherein at least one observation point pertains to a behavior or characteristic of hardware provided by said at least one device.

5. The method of claim 1, wherein at least one observation point pertains to a context within which said at least one device operates, without being a property of the said at least one device itself.

6. The method of claim 1, wherein the dependency graph that is initially received is produced by:
    receiving initial dependency information that indicates candidate dependencies among the observation points;
    generating a first dependency graph based on the initial dependency information; and
    updating the first dependency graph based on collected data received from trial devices within a report-intensive trial phase of operation, to produce an initial dependency graph.

7. The method of claim 1, wherein one analysis factor pertains to existence of an uncertain dependency hypothesis, as expressed in the dependency graph.

8. The method of claim 1, wherein one analysis factor pertains to existence of an undiagnosed failure, associated with the collected data.

9. The method of claim 1, wherein said generating at least one directive comprises:
    generating a first set of directives to be transmitted to a first group of devices; and
    generating a second set of directives to be transmitted to a second group of devices,
    wherein the first group of devices at least partially differs from the second group of devices, and the first set of directives at least partially differs from the second set of directives.

10. The method of claim 1, wherein said updating comprises:
    determining whether the collected data conforms to the dependency graph; and
    if the collected data does not conform to the dependency graph, updating the dependency graph so that the dependency graph is more conformant with the collected data.

11. The method of claim 1, further comprising inferring information regarding at least one observation point based on the dependency graph in conjunction with the collected data.

12. The method of claim 1, further comprising:
    classifying behavior of the program resource based on available evidence associated with the program resource, to provide at least one conclusion; and
    notifying an entity associated with producing the program resource of at least one of: (a) the available evidence; and (b) said at least one conclusion.

13. The method of claim 12, wherein the available evidence comprises one or more of:
    the collected data;
    one or more inferences drawn from the collected data; and
    the dependency graph.

14. The method of claim 1, further comprising receiving at least one directive from an entity associated with producing the program resource.

15. An analysis management system, comprising:
a processor configured to:
maintain a dependency graph that describes dependencies among observation points associated with a program resource;
determine plural sets of directives to be sent to plural respective groups of mobile devices, wherein at least one set of directives at least partially differs from another set of directives; and
receive collected data from the plural groups of mobile devices in response to the plural sets of directives.

16. The analysis management system of claim 15, further comprising updating the dependency graph based on the collected data, and generating updated sets of directives to be sent to the plural respective groups of mobile devices based on the collected data.

17. The analysis management system of claim 15, further comprising
classifying behavior of the program resource based on available evidence associated with the program resource, to provide at least one conclusion; and
notifying an entity associated with producing the program resource of at least one of: (a) the available evidence; and (b) said at least one conclusion.

18. The analysis management system of claim 17, wherein the available evidence comprises one or more of:
the collected data;
one or more inferences drawn from the collected data; and
the dependency graph.

19. A computer readable storage device for storing computer readable instructions, the computer readable instructions providing an analysis management system when executed by one or more processing devices, the computer readable instructions comprising:
logic for providing a dependency graph that describes dependencies among observation points associated with a program resource;
logic for determining at least one focus of investigation based on at least one uncertain dependency hypothesis, as expressed in the dependency graph;
logic for generating at least one directive based on said at least one focus of direction, to be transmitted to at least one device;
logic for receiving collected data from said at least one device in response to said at least one directive;
logic for classifying behavior of the program resource based on available evidence associated with the program resource, to provide at least one conclusion, the available evidence comprising:
the collected data;
one or more inferences drawn from the collected data; and
the dependency graph; and
logic for notifying an entity associated with producing the program resource of at least one of: (a) the available evidence; and (b) said at least one conclusion.

20. The computer readable storage device of claim 19, further comprising logic for updating the dependency graph, if deemed appropriate, based on the collected data.

* * * * *